Patented Jan. 27, 1931

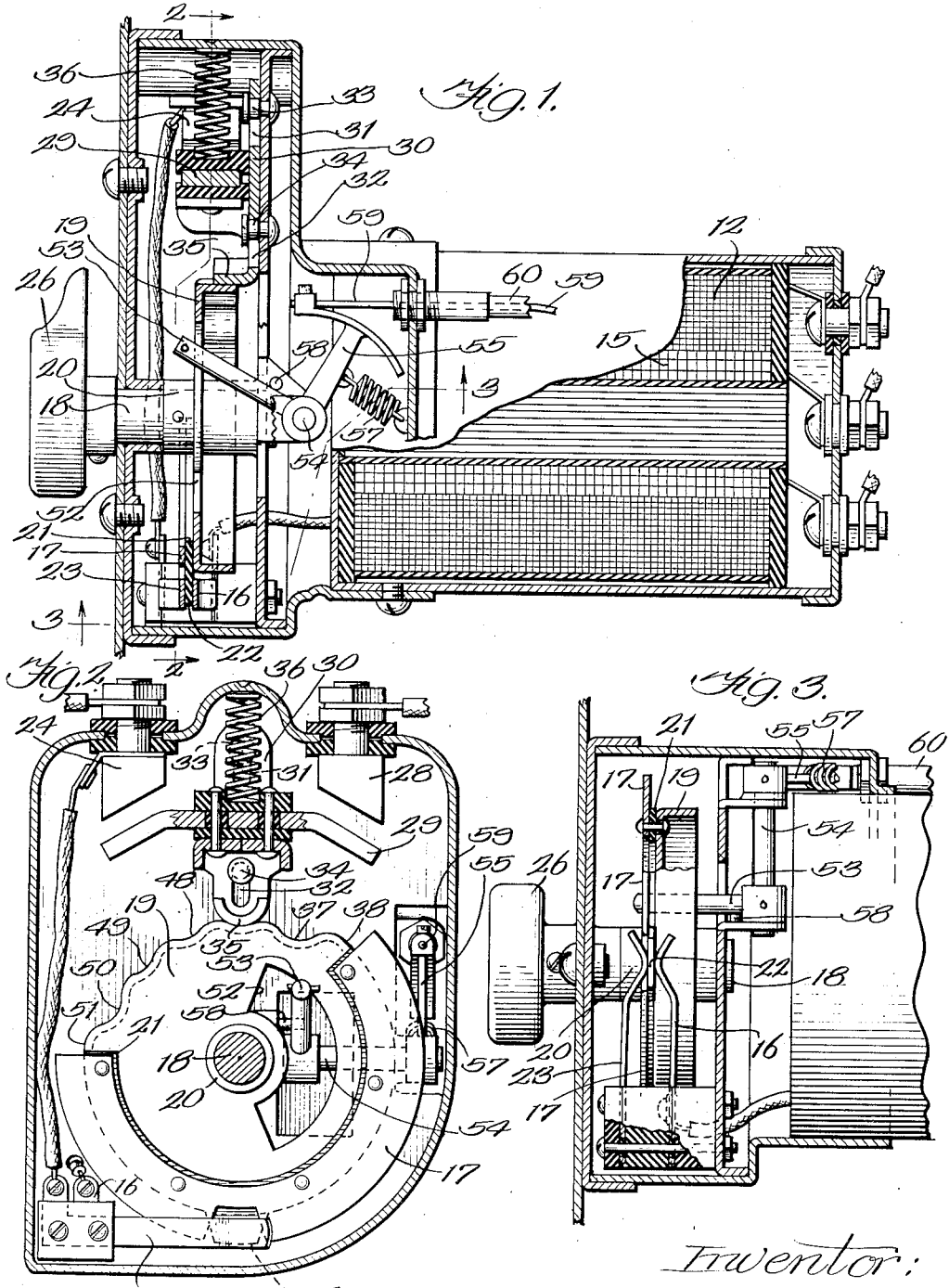

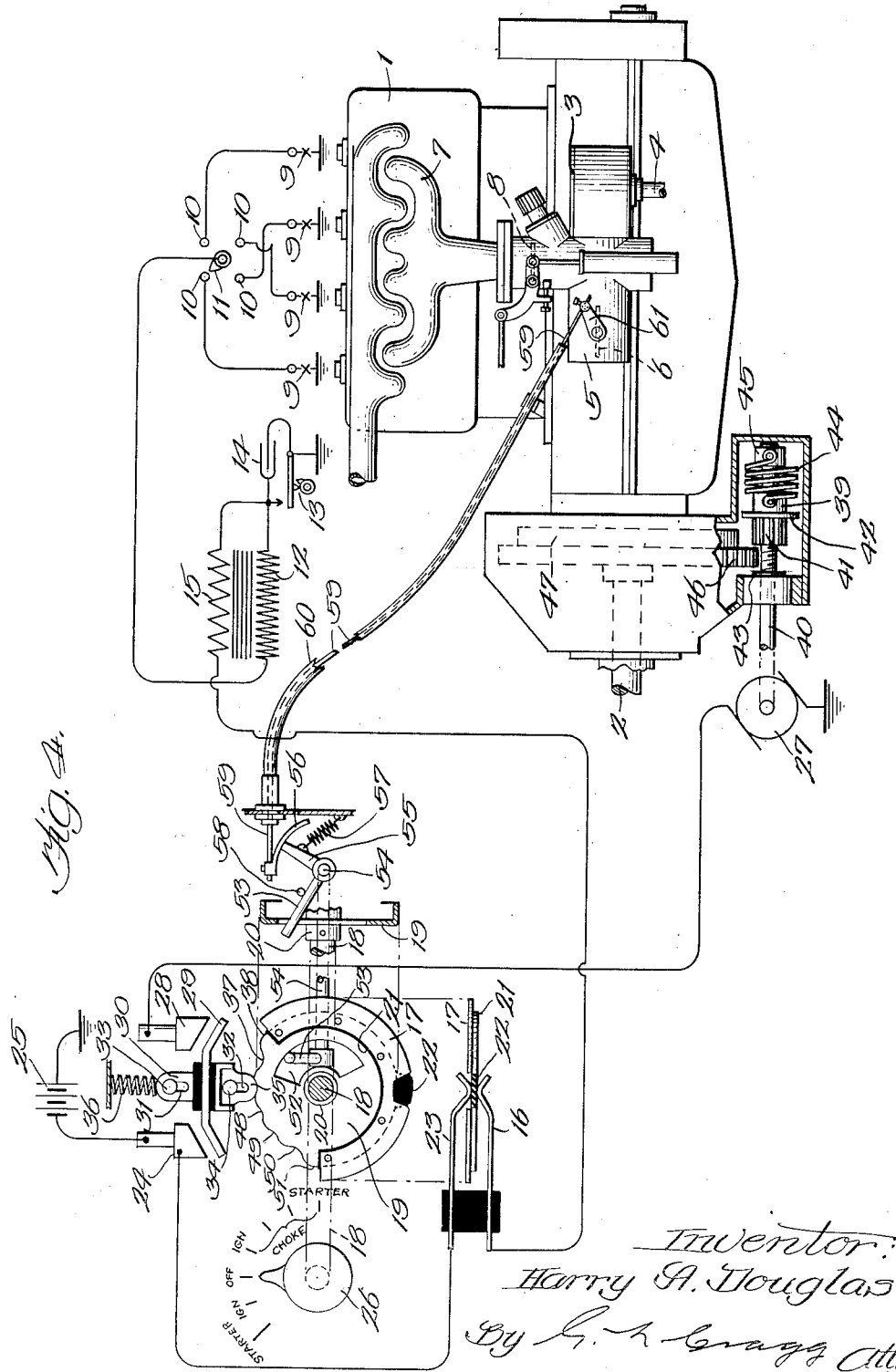

1,790,264

UNITED STATES PATENT OFFICE

HARRY A. DOUGLAS, OF BRONSON, MICHIGAN

INTERNAL-COMBUSTION-ENGINE POWER PLANT

Application filed June 14, 1929. Serial No. 370,867.

My invention relates to power plants employing internal combustion engines and has for its general object the simplification of the mechanism which is employed for controlling the ignition circuit, the circuit of the starting motor, and the throttle or choke valve which regulates the supply of air to the carburetor.

In accordance with one feature of the invention the switching mechanism which is in controlling relation with the ignition circuit has a rotatable operating means that is also in controlling relation to the valve.

In accordance with another feature of the invention the switching mechanism which is in controlling relation with the circuit of the starting motor has a rotatable operating means that is also in controlling relation to the valve.

In accordance with another feature of the invention the switches which control the ignition circuit and the circuit of the starting motor have a common operating element. This common rotatable operating element which, in the preferred embodiment of the invention, is also in controlling relation to the throttle or choke valve. The two switches and the throttle valve mechanism are so related with each other and with the common element that operates them so that the various operations employed in starting the engine and maintaining it in operation are performed in proper relation and in orderly sequence.

My invention has for another object the provision of means whereby the ignition and starting circuits may be closed without the operation of the throttle or choke valve or with the attendant operation of this valve as desired. While this result is secured by the operation of the common or rotatable operating element hitherto mentioned, yet this feature of the present invention is not to be thus limited.

The invention will be more fully explained in connection with the accompanying drawings in which Fig. 1 is a longitudinal sectional view illustrating the preferred embodiment of the invention; Fig. 2 is a sectional view on line 2—2 of Fig. 1; Fig. 3 is a sectional view on line 3—3 of Fig. 1; and Fig. 4 is a diagrammatic illustration of an automotive power plant equipped with apparatus of my invention.

My invention is particularly adapted for use in conjunction with the well known power plant illustrated in Fig. 4, though the invention is not to be thus limited. The power plant illustrated includes an internal combustion engine 1 which is in driving relation with the engine shaft 2. Such an engine is equipped with any well known or suitable carburetor such as that indicated at 3. Gasolene or other liquid fuel is supplied to the carburetor through the pipe 4 and the air which is to be carbureted is admitted at the air inlet 5. A throttle valve 6 is disposed in this air inlet to regulate the volume of air which is permitted to flow into the carburetor. The carbureted air is supplied to the manifold 7 and is there distributed to the cylinders. A throttle valve 8 governs the volume of carbureted air that flows through the manifold. The engine illustrated has four cylinders and each cylinder has a sparking plug 9. One terminal of each sparking plug is grounded and the other terminal is connected with the corresponding stationary contact 10. These stationary contacts are arranged in a circle upon whose center a distributing arm 11 turns to bring the contacts 10 successively into circuit with the spark plugs. The distributing arm 11 is in serial relation with the secondary or induced winding 12 of the transformer. This winding is grounded through the circuit interrupter 13. The contacts of the interrupter are shunted by a condenser 14. The primary 15 of the transformer has one terminal connected with one terminal of the transformer 12 and its other terminal connected with the stationarily mounted switch contact 16. An elongated arcuate contact 17 is coaxial with the shaft 18 upon which it is mounted. Said arcuate contact is assembled with the shaft through the intermediation of a wheel 19 which is preferably in the form of a cup and whose hub 20 is directly secured to said shaft. A body of insulation 21 electrically separates the arcuate contact from said wheel, the wheel being preferably metallic. A gap is formed a little to one side of the middle of contact 17, this gap being substantially bridged by a plate of insulation 22 which may be a part of 21. The free end of the contact spring 16 presses against the inner side of the contact 17 or the inner side of the insulating bridge 22 according to the position of said contact. Another contact spring 23, similar in shape to the contact 16, is symmetrically related thereto and so positioned that it presses upon the outer side of the contact 17 or the bridge 22. The contacts 16 and 23 are thus either electrically connected or electrically separated according to the position of the contact 17. The contact 23 is grounded through a contact 24 that pertains to a starting switch which will later be described. A battery 25 is interposed between the contact 24 and ground. A handle or knob 26 is secured upon the shaft 18 so that it may be employed to operate the contact 17 to establish or open the ignition circuit. The wheel 19 has an arcuate rim portion thereof that intervenes between the ends of the contact 17 formed into a cam which serves to govern the throttle valve 6. The control of the starting motor circuit will be described. This circuit is inclusive of the aforesaid grounded battery 25 and the aforesaid contact 24, a contact 28, an operating contact 29 that is brought into and out of engagement with the contacts 24 and 28 and the motor 27 which is grounded. The contact 29 is provided upon a carriage 30 which has aligned slots 31, 32 which receive guiding pins 33 and 34. These slots and pins are radially aligned with the center of the wheel 19. Said carriage has a rounded nose 35 which rides upon the arcuate cam portion of the wheel 19. A spring 36 maintains said nose in engagement with said cam portion. When it is not desired to choke the air inlet 5, the knob or handle 26 is turned to the left from the idle position shown in Fig. 4. In being so turned the cam depression 37 of the wheel is brought into engagement with the nose 35, whereupon the insulating bridge 22 is withdrawn from between the springs 16 and 23 and the part of the contact 17 upon the left of this bridge is brought between these springs to electrically connect them and establish the ignition circuit. After the ignition circuit is closed, the knob or handle 26 is turned another step in a counterclockwise direction to bring the cam rise 38 into engagement with the nose 35 whereby the bridging contact 29 is engaged with the contacts 24 and 28 to close the circuit of the starting motor 27, the ignition circuit remaining closed owing to the disposition and the arcuate length of the contact 17. Any suitable starting means may be employed. The starting means illustrated is very well known and needs no description. However, it may be said that in addition to the electric motor 27 it is inclusive of a sleeve 39 that is threaded upon the shaft 40 so as to be movable along the same to a limited extent. This sleeve has a portion thereof in the form of a pinion 41, this pinion and the balance of the sleeve being spaced apart by a flange 42 that is provided upon the sleeve. An abutment 43 in arranged to limit the extent to which the sleeve 39 is moved by the shaft 40 when this shaft is set into rotation by the motor 27. A coiled spring 44 is anchored, at one end, to a collar 45 which is loose upon the shaft 40, and at its other end to the sleeve 39. The pinion 41 is brought into and out of mesh with a gear 46 that is fixed upon and coaxial with the engine flywheel 47.

When it is desired to choke or throttle the flow of air into the inlet 5 the throttle valve 6 is turned crosswise of the inlet, an adjustment which is effected through the intermediation of suitable mechanism that is to be described. In this operation the knob or handle 26 is turned clockwise, the nose 35 of the carriage 30 being successively engaged by the cam depressions 48, 49 and 50 and finally by the cam rise 51. During the travel of the wheel 19 from its idle position shown in Fig. 4 to the position in which the cam rise 51 thereon engages the nose 35 the ignition circuit is established at the initial part of the movement of the wheel and is maintained throughout the continued movement of the wheel clockwise. When the cam rise 51 is reached, the bridging contact 29 engages both contacts 24 and 28 to close the circuit of the starting motor 27. When the cam depression 48 is brought into engagement with the nose 35 the ignition circuit is alone established. When the cam depression 49 is brought into engagement with said nose the throttle valve 6 is diagonally placed to partially choke the flow of air into the inlet 5. When the cam depression 50 is brought into engagement with the nose 35 the throttle valve 6 is turned to its fully choking position. The wheel 19 desirably effects the choking adjustment of the throttle valve 6. To this end the wheel is formed with an arcuate slot 52 through which a lever arm 53 projects. When the cam depression 48 is engaged with the nose 35 the upper end of this slot just about engages said lever arm. When the cam depression 49 engages the nose 35 said lever arm is turned throughout a corresponding range to effect the partial choking closure of the throttle valve 6. When the cam depression 50 engages the nose 35 said lever arm is turned through the balance of its range of movement to complete the choking closure of the throttle valve. The mechanism through which the lever arm 53 operates to adjust the valve 6 is inclusive of a shaft 54 to which said arm is secured. Another arm 55 fixed upon said shaft and an arcuate member 56 upon the outer end of the arm 55 and which constitutes with this arm a pulley segment. When the wheel 19 turns the arm 53 in one direction it does so against the force of a spring 57. When said wheel is turned counterclockwise the spring 57 restores the arm to its idle position which is defined by any suitable means such as a stop 58. Motion from the arcuate pulley 55, 56 is imparted to the throttle valve 6 through a link 59 which is preferably formed of piano wire. This wire passes through a guiding conduit 60, one end of the wire being secured to the arcuate pulley and the other end being in swivel connection with an arm 61 which is in fixed relation with the valve 6. As hitherto stated, when the depression 49 is engaged with the nose 35 of the carriage 30, the valve 6 is partially closed and when the depression 50 engages said nose said valve is brought to its final choking position. When the engine has been started the wheel is turned to remove the nose 35 from engagement with the cam rise 38 or 51 that engages the same thereby to open the circuit of the starting motor. It will be observed that the cam rises that are between the cam depressions are not as high as the cam rises 38 and 51, so that the circuit of the starting motor is not closed except when it is in engagement with the rises 38 or 51. In my copending application Serial No. 370,866 I have disclosed reciprocable means for governing the controlling circuits of an internal combustion engine, and have therein claimed the same broadly and specifically.

Changes may be made without departing from the invention.

Having thus described my invention, I claim:

1. The combination with an internal combustion engine; of a carburetor through which air, carbureted thereby, is supplied to the engine; a throttle valve for regulating the supply of air to the carburetor; an electric motor in driving relation to the engine to start it; and a switch in controlling relation to the circuit of the motor and having a rotatable operating member that is in controlling relation to said valve, wherein the rotatable operating member is inclusive of a cam which engages an adjustable contact that is provided for the switch that controls the circuit of the starting motor, the cam serving to adjust this contact into and out of circuit closing position.

2. The combination with an internal combustion engine having an electrical ignition circuit; of an electric motor in driving relation with the engine shaft to start it; a carburetor through which air, carbureted thereby, is supplied to the engine; a throttle valve for regulating the supply of air to the carburetor; and switches in controlling relation to the ignition circuit and the circuit of said electric motor, both of said switches having one rotatable operating member in controlling relation thereto and to said valve, wherein the switches are relatively related to the operating member to enable this member to establish the ignition circuit before establishing the circuit of the electric motor and wherein the rotatable operating member is inclusive of a cam which engages an adjustable contact that is provided for the switch that controls the circuit of the starting motor, the cam serving to adjust this contact into and out of circuit closing position.

3. The combination with an internal combustion engine having an electrical ignition circuit; of an electric motor in driving relation with the engine shaft to start it; a carburetor through which air, carbureted thereby, is supplied to the engine; a throttle valve for regulating the supply of air to the carburetor; and switches in controlling relation to the ignition circuit and the circuit of said electric motor, both of said switches having one rotatable operating member in controlling relation thereto and to said valve, wherein the rotatable operating member is inclusive of a cam which engages an adjustable contact that is provided for the switch that controls the circuit of the starting motor, the cam serving to adjust this contact into and out of circuit closing position.

4. The combination with an internal combustion engine having an electrical ignition circuit; of an electric motor in driving relation with the engine shaft to start it; a carburetor through which air, carbureted thereby, is supplied to the engine; a throttle valve for regulating the supply of air to the carburetor; and switches in controlling relation to the ignition circuit and the circuit of said electric motor, both of said switches having one rotatable operating member in controlling relation thereto and to said valve, wherein the switches are relatively related to the operating member to enable this member to establish the ignition circuit before establishing the circuit of the electric motor and wherein the rotatable operating member is inclusive of a cam which engages an adjustable contact that is provided for the switch that controls the circuit of the starting motor, the cam serving to adjust this contact into and out of circuit closing position.

5. The combination with an internal combustion engine; of a carburetor through which air, carbureted thereby, is supplied to the engine; a control valve for regulating the supply of air to the carburetor; a rotatable manually operable element; and means operable by this rotatable element that is in actuating relation thereto, this means being in controlling relation to said valve, wherein the rotatable element and the means actuated thereby are in lost motion relation.

In witness whereof, I hereunto subscribe my name.

HARRY A. DOUGLAS.